(12) United States Patent
Solivan et al.

(10) Patent No.: US 7,492,140 B2
(45) Date of Patent: Feb. 17, 2009

(54) NEGATIVE CURRENT CONTROL FOR VOLTAGE REGULATOR

(75) Inventors: Thovane Solivan, Hillsboro, OR (US); Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 449 days.

(21) Appl. No.: 10/967,829

(22) Filed: Oct. 18, 2004

(65) Prior Publication Data
US 2006/0082353 A1    Apr. 20, 2006

(51) Int. Cl.
    *G05F 1/40*    (2006.01)
(52) U.S. Cl. .................. 323/284; 323/222; 323/283
(58) Field of Classification Search ............. 323/222, 323/225, 280, 282, 283, 284, 351, 276, 277; 703/320
See application file for complete search history.

(56) References Cited

U.S. PATENT DOCUMENTS

| | | | | |
|---|---|---|---|---|
| 5,371,668 A | * | 12/1994 | Gurwicz et al. | 363/132 |
| 5,637,981 A | * | 6/1997 | Nagai et al. | 320/160 |
| 5,731,731 A | * | 3/1998 | Wilcox et al. | 327/403 |
| 6,329,801 B1 | * | 12/2001 | Zuniga et al. | 323/282 |
| 6,894,591 B2 | * | 5/2005 | Juenger | 713/320 |
| 6,894,691 B2 | * | 5/2005 | Juenger | 345/531 |
| RE39,065 E | * | 4/2006 | Nelson | 323/284 |
| 7,030,596 B1 | * | 4/2006 | Salerno et al. | 323/282 |

* cited by examiner

*Primary Examiner*—Jessica Han
(74) *Attorney, Agent, or Firm*—Buckley, Maschoff & Talwalkar LLC (57) ABSTRACT

A system may include a voltage regulator controller to provide a control signal, a voltage regulator converter comprising a power switching element coupled between an output node of the voltage regulator converter and ground, the voltage regulator converter to receive the control signal, and a logic circuit to detect current flow from the output node to the voltage regulator converter and to disable the power switching element in response to detecting the current flow.

17 Claims, 9 Drawing Sheets

NEGATIVE CURRENT CONTROL FOR VOLTAGE REGULATOR

BACKGROUND

A voltage regulator may convert power that is received from a power supply at first voltage and current levels to second voltage and current levels. According to some examples, the power is supplied at 12V and 20 A and is converted by the voltage regulator to 1V and 100 A. The converted voltage and current levels may be suitable for providing power to a load such as an integrated circuit (IC).

The power required by a load may vary during operation. For example, an IC may require 1V and 100 A during typical operation but may occasionally enter into a low power mode that requires lower voltage and current levels. Entry into such a state may cause an output circuit of the voltage regulator to discharge. This current flow may unsatisfactorily reduce an efficiency of the voltage regulator.

DETAILED DESCRIPTION

Figure 1:
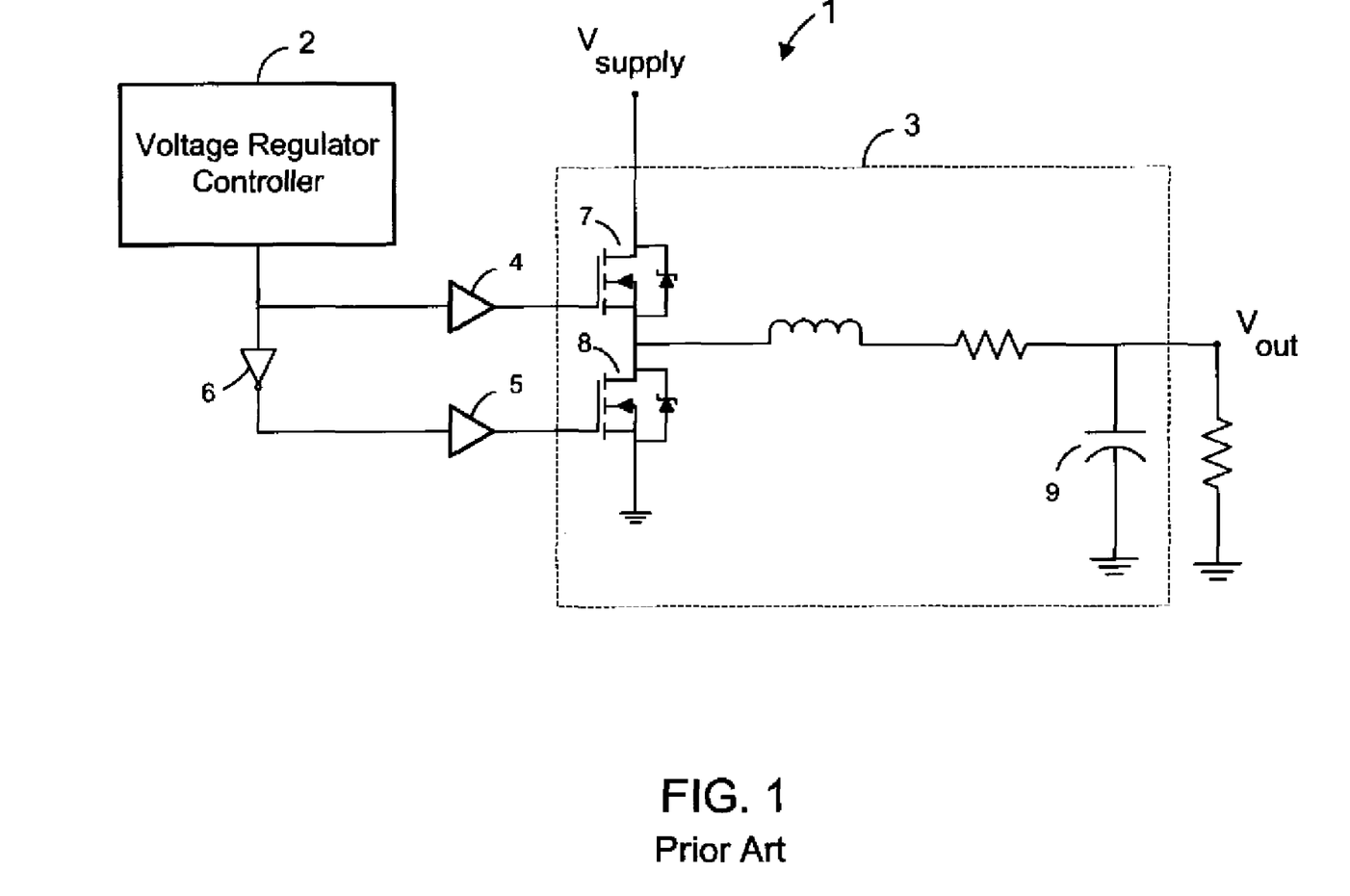
FIG. 1 is a schematic diagram of a conventional voltage regulator.

FIG. 1 is a circuit diagram of a conventional voltage regulator. As is currently known, voltage regulator 1 includes voltage regulator controller 2 and voltage regulator converter 3. Voltage regulator 1 may be used to convert a supply voltage ($V_{supply}$) to a desired output voltage ($V_{out}$).

In one example of operation, voltage controller 2 transmits control signals to drivers 4 and 5. By virtue of inverter 6, the control signal transmitted to driver 4 is 180 degrees out of phase with the control signal transmitted to driver 5. Drivers 4 and 5 control respective power switching elements 7 and 8 in accordance with the control signals. Power switching elements 7 and 8 each comprise n-channel metal-oxide semiconductor field effect transistors (MOSFETs).

Due to the phase relationship of the aforementioned control signals, one of elements 7 and 8 will be "closed" (i.e., substantially allowing current to pass from drain to source) and the other will be "open" (i.e., substantially preventing current from passing from drain to source) during operation of converter 3. The selective opening and closing of elements 7 and 8 is intended to cause a desired voltage $V_{out}$ to develop at the illustrated output node. Under some circumstances, output capacitor 9 may discharge from the output node to ground through power switching element 8.

Figure 2:
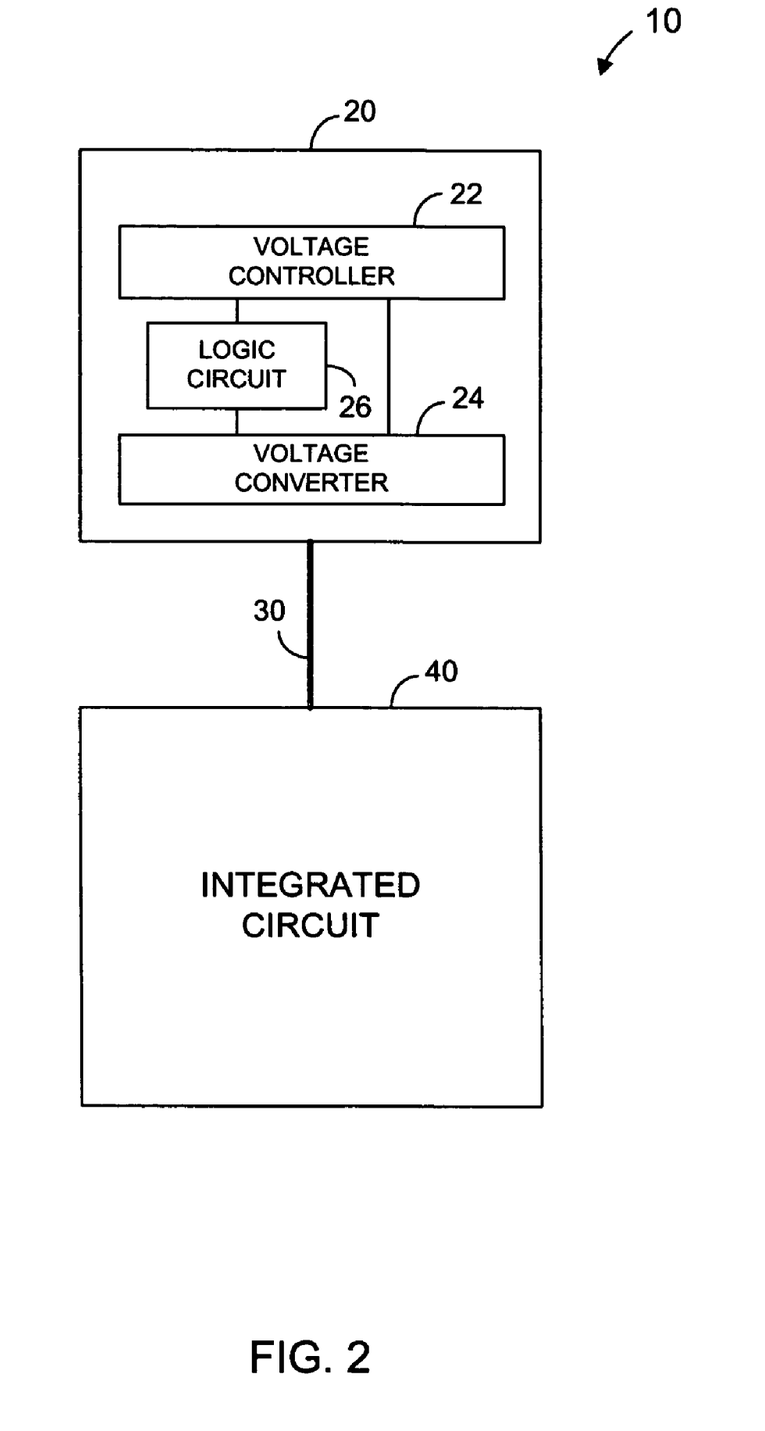
FIG. 2 is a block diagram of a system according to some embodiments.

FIG. 2 is a block diagram of system 10 according to some embodiments. System 10 comprises voltage regulator 20, which in turn comprises voltage regulator controller 22, voltage regulator converter 24 and logic circuit 26. Voltage regulator 20 outputs power at a desired output voltage value to power bus 30, which in turn provides the power to IC 40. IC 40 may comprise a microprocessor or any suitable IC. System 10 may be used in a computer motherboard or in any other platform according to some embodiments. For example, voltage regulator 20 may be implemented as a voltage regulator "module" that is mounted to a substrate that in turn may be coupled to a motherboard, as a voltage regulator "down" having elements that are mounted directly on a motherboard, or in any other fashion.

Generally, voltage regulator controller 22 and voltage regulator converter 24 may comprise any currently- or hereafter-known systems to provide regulated power to IC 40. According to some embodiments, logic circuit 26 detects current flow from an output node of voltage regulator converter 24 through voltage regulator converter 24, and disables a power switching element of voltage regulator converter 24 in response to detecting the current flow. The power switching element is coupled between the output node and ground.

In some embodiments, logic circuit 26 then detects no current flow from the output node to the voltage regulator converter, detects an active control signal from voltage regulator controller 22, and enables the power switching element in response to detecting no current flow and detecting the active control signal. In other embodiments, logic circuit 26 then sets a timer in association with the disabling of the power switching element, detects an elapsing of the timer, and enables the power switching element in response to the elapsing of the timer. Detailed examples of each of these implementations will be presented below.

Figure 3:
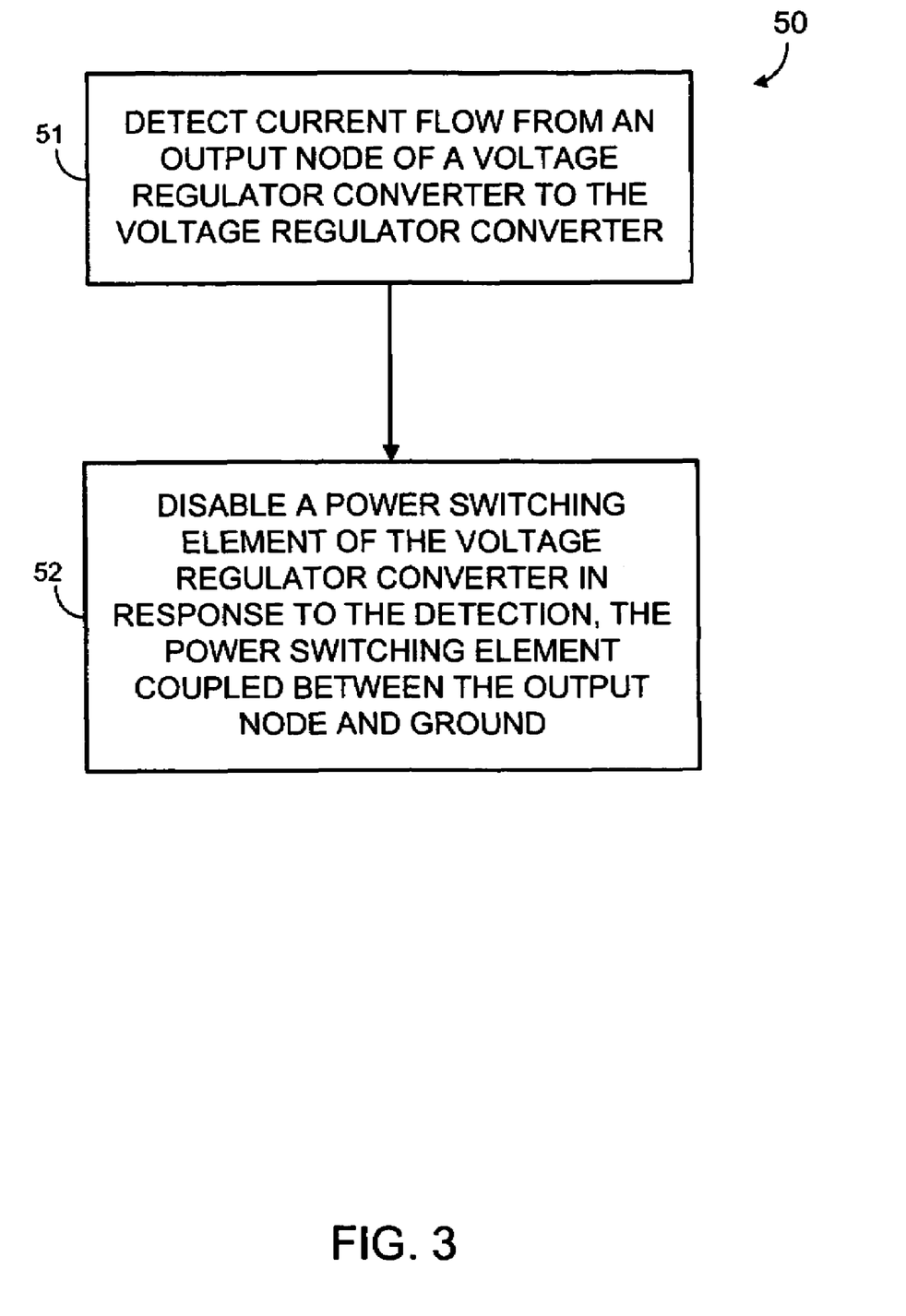
FIG. 3 is a diagram of a process according to some embodiments.

FIG. 3 is a flow diagram of process 50. Process 50 includes procedures executed by voltage regulator 20 according to some embodiments. Process 50 may be executed by any suitable combination of discrete components, integrated circuits, and/or software.

Initially, current flow from an output node of a voltage regulator converter to the voltage regulator converter is detected at 51. Next, at 52, a power switching element of voltage regulator converter 24 is disabled in response to the detection of the current flow. The power switching element is coupled between the output node and ground. Some embodiments of process 50 may provide efficient operation of a voltage regulator.

Figure 4:
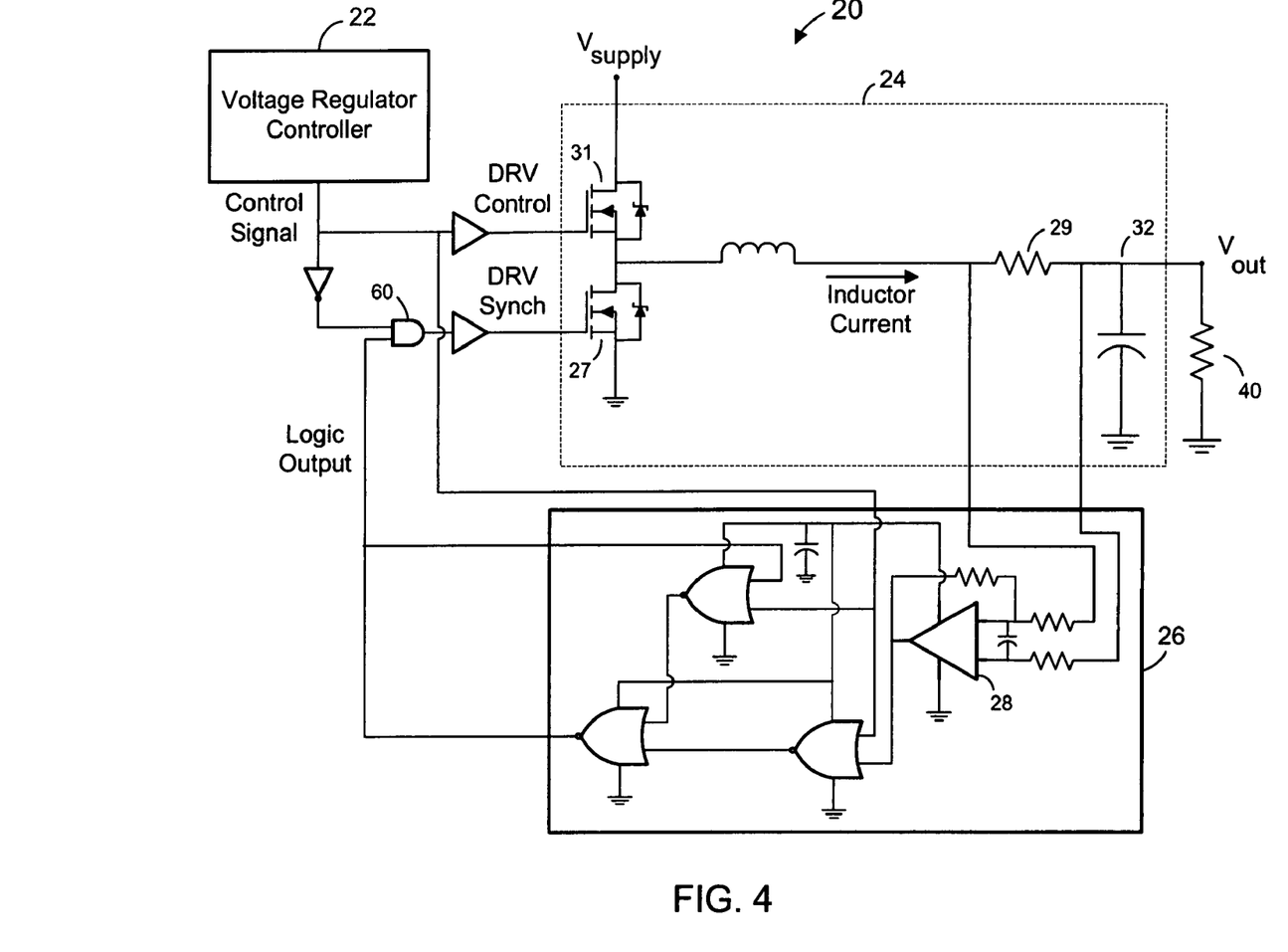
FIG. 4 is a schematic diagram of a voltage regulator according to some embodiments.

FIG. 4 is a circuit diagram of one embodiment of voltage regulator 20. Voltage regulator 20 of FIG. 4 may be used to implement process 50. Voltage regulator 20 of FIG. 4 is identical to voltage regulator 1 of FIG. 1 except for the inclusion of AND gate 60 and logic circuit 26. The actual components used to implement the common elements of FIGS. 1 and 4 may differ.

Voltage regulator 20 of FIG. 4 may operate to detect current flow from output node $V_{out}$ to voltage regulator converter 24, and to disable power switching element 27 in response to the detection of the current flow. The current flow may result from the discharging of output capacitor 32 through power switching element 27.

In some examples of process 50, comparator 28 of logic circuit 26 detects a voltage drop from the right side to the left side of resistor 29. Logic circuit 26 then causes the signal Logic Output to go low. The output of AND gate 60 remains low as long as Logic Output is low. Accordingly, a control signal (DRV Synch) applied to power switching element 27 is disabled while Logic Output is low. Disabling of DRV Synch thereby disables power switching element 27. As a result, the discharging of capacitor 32 through element 27 may be inhibited.

Voltage regulator 20 of FIG. 4 may also detect no current flow from node $V_{out}$ to voltage regulator converter 24, detect an active control signal from voltage regulator controller 22, and enable power switching element 27 in response to detecting no current flow and detecting the active control signal. According to one example of the foregoing, comparator 28 no longer detects the voltage drop from the right side to the left side of resistor 29. Logic circuit 26 therefore causes Logic Output to go high, thereby allowing AND gate 60 to pass an inverted version of the signal Control Signal that is output by voltage regulator controller 22. Such an action enables power switching element 27, which will thereafter pass current when Control Signal goes low (i.e., DRV Synch goes high).

Figure 5:
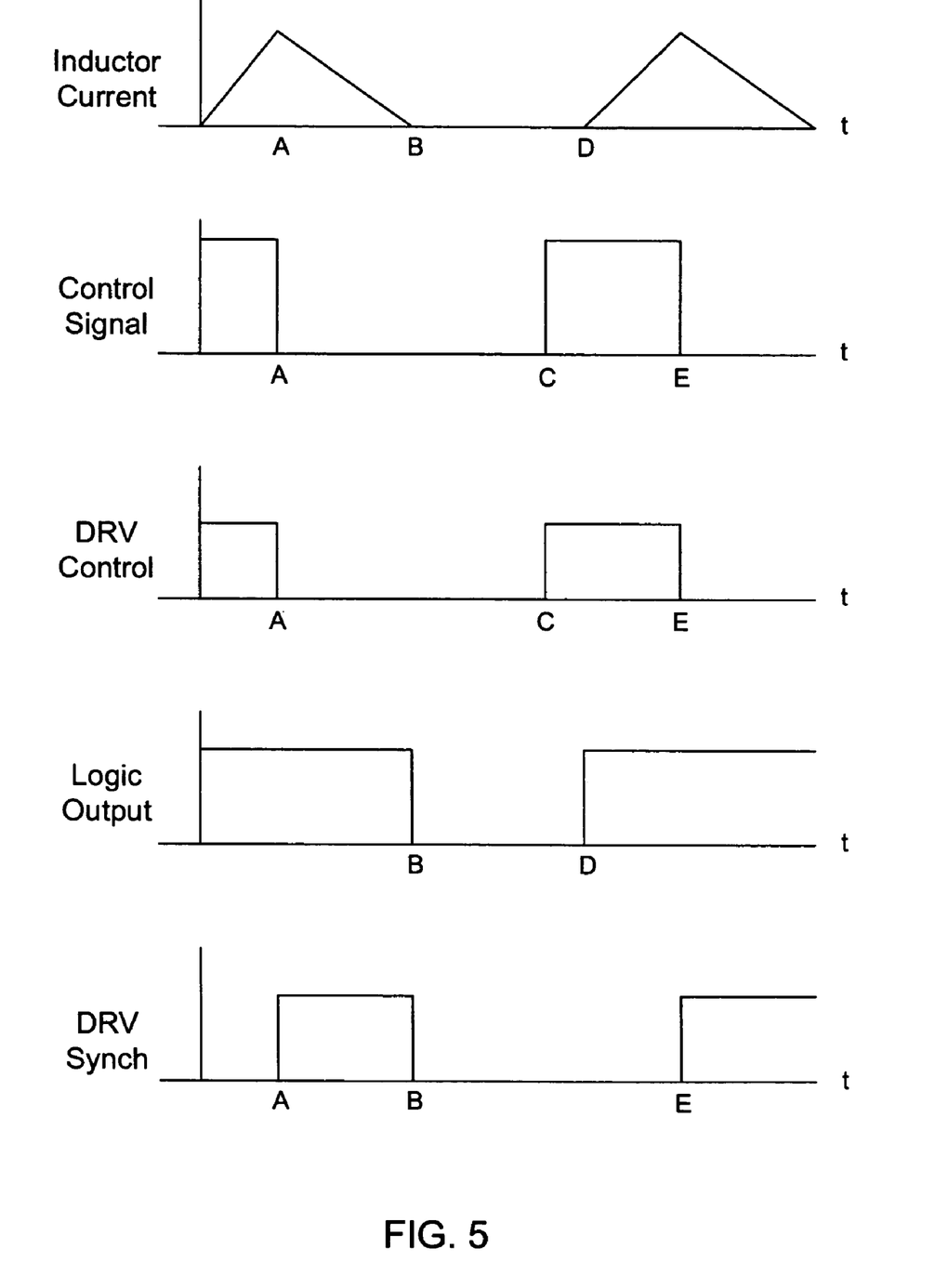
FIG. 5 comprises graphs of amplitude vs. time for several signals according to some embodiments.

FIG. 5 comprises graphs of amplitude vs. time for certain signals during operation of the FIG. 4 system according to some embodiments. Other hardware implementations may be used to result in the signal behavior illustrated in FIG. 5.

Control Signal from voltage regulator controller 22 is high from time t=0 to t=A. The signal DRV Control shown in FIG. 4 is therefore also high from time t=0 to t=A, which enables power switching element 31. As a result, the Inductor Current flowing from node $V_{out}$ to voltage regulator converter 24 ramps up from t=0 to t=A. Since Inductor Current is non-negative (i.e. does not flow from the right to the left of resistor 29) from t=0 to t=A, Logic Output remains high from t=0 to t=A. AND gate 60 is enabled by Logic Output, therefore DRV Synch is 180 degrees out of phase with DRV Control from t=0 to t=A.

Control Signal goes low at t=A. DRV Control therefore also goes low, and DRV Synch goes high. The magnitude of Inductor Current falls from t=A until t=B. Inductor Current begins to go negative at t=B, which indicates current flow from the right to the left of resistor 29. Comparator 28 of logic circuit 26 detects this current flow and Logic Output goes low at t=B as a result. AND gate 60 is therefore disabled at t=B, thereby disabling DRV Synch and element 27. The disabling of element 27 inhibits current from flowing from output capacitor 32 to ground through element 27. A negative Inductor Current may thereby be avoided.

Control Signal from voltage controller 22 goes high at t=C, causing DRV Control to also go high. Inductor Current begins to go positive (i.e., flow from left to right of resistor 29) at t=D. Logic circuit 26 detects the positive Inductor Current and outputs a high Logic Signal at t=D. Logic Signal thereby enables AND gate 60, which allows DRV Synch to go high when Control Signal and DRV Control drop low at time t=E.

Figure 6:
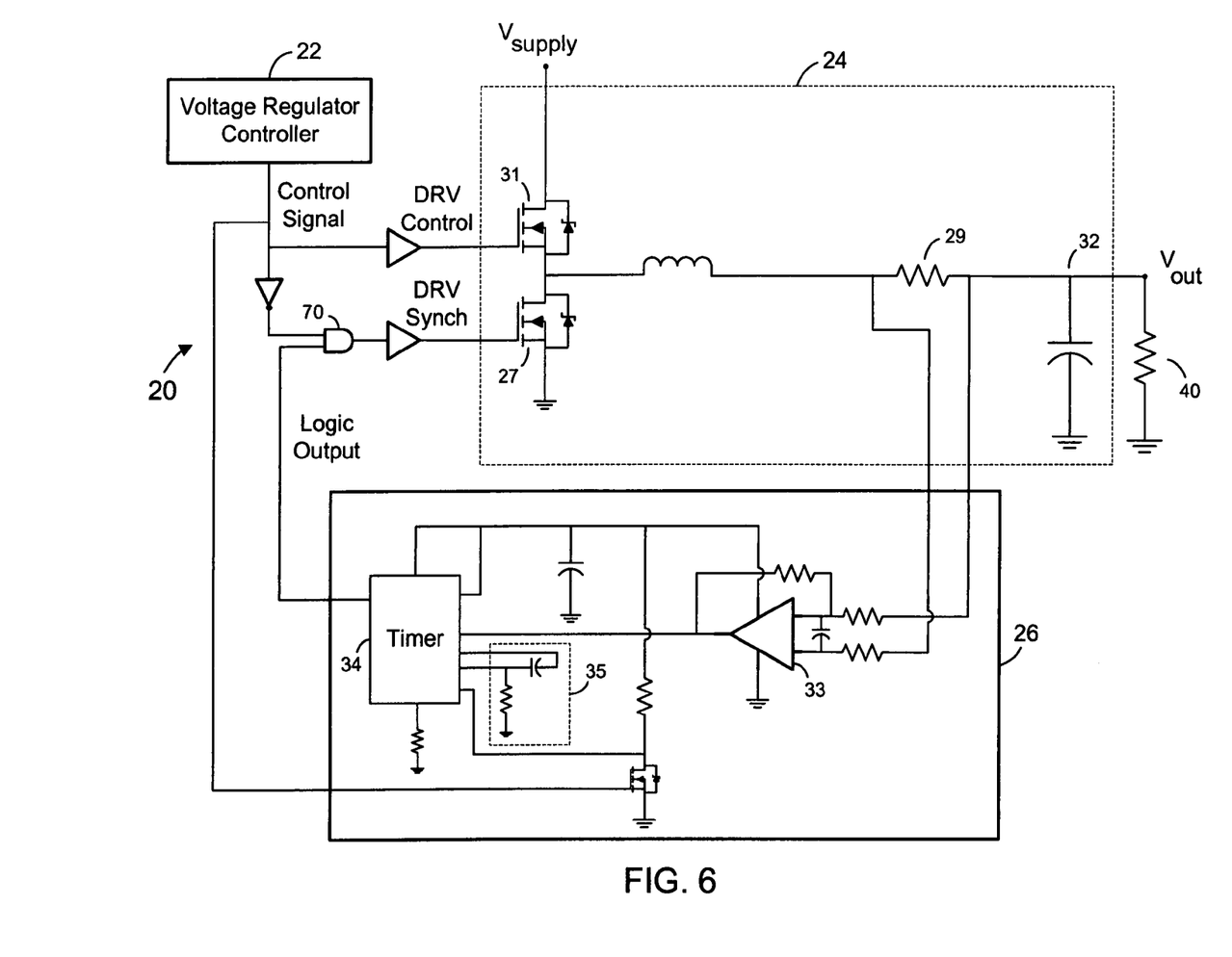
FIG. 6 is a schematic diagram of a voltage regulator according to some embodiments.

FIG. 6 is a circuit diagram according to some embodiments of voltage regulator 20. Voltage regulator 20 of FIG. 6 may also be used to implement process 50. Voltage regulator 20 of FIG. 6 is identical to voltage regulator 20 of FIG. 4 except for the arrangement and components of logic circuit 26. The actual components used to implement the common elements of FIGS. 4 and 6 may differ.

Voltage regulator 20 of FIG. 6 may detect current flow from node $V_{out}$ (e.g. discharging from capacitor 32) to voltage regulator converter 24, and disable power switching element 27 in response to the detection of the current flow. In one example of operation, comparator 33 of logic circuit 26 detects a voltage drop from the right side to the left side of resistor 29. Logic circuit 26 then causes Logic Output to go low, and DRV Synch remains low as long as Logic Output is low. Accordingly, power switching element 27 is disabled while Logic Output is low. The disabling of power switching element 27 may inhibit the discharging of capacitor 32 through element 27.

According to some embodiments, logic circuit 26 sets timer 34 in association with the disabling of power switching element 27, detects an elapsing of timer 34, and enables power switching element 27 in response to the elapsing of timer 34. For example, after comparator 33 detects the voltage drop from the right side to the left side of resistor 29, timer 34 may be set and Logic Output may be brought low. Timer 34 detects the elapsing of a timer delay that is associated with timer 34 and causes Logic Output to go high in response to the elapsing of the timer delay. AND gate 70 is thereby allowed to pass an inverted version of Control Signal that is output by voltage regulator controller 22. The high Logic Output may therefore be considered to enable power switching element 27. When enabled, element 27 will pass current in a case that Control Signal goes low (i.e., DRV Synch goes high).

Timer 34 may comprise any currently- or hereafter-known timer that is capable of one-shot operation. Any suitable method may be used to configure the delay of the timer. In some embodiments, impedance values of an RC circuit such as circuit 35 determine the delay of timer 34.

Figure 7:
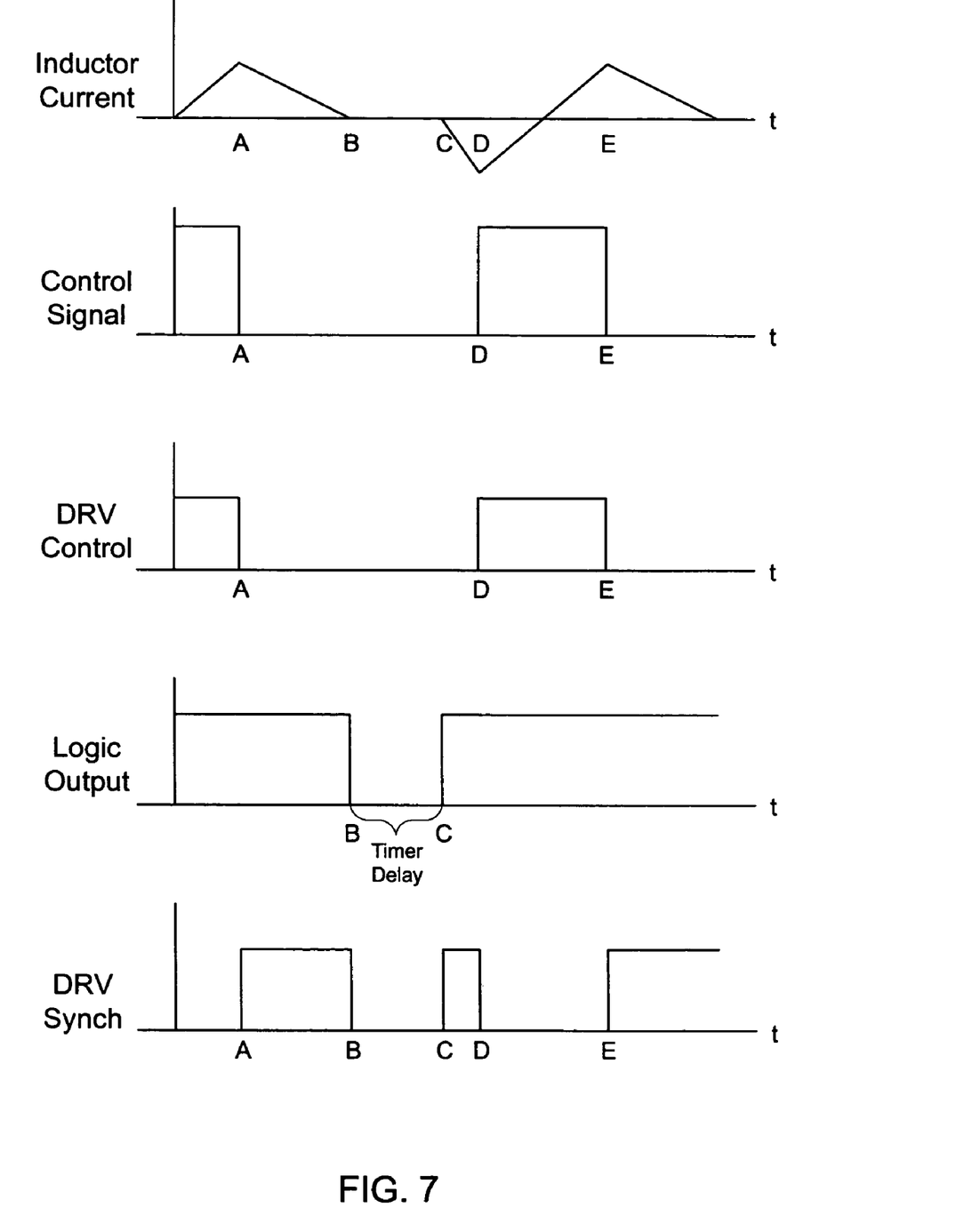
FIG. 7 comprises graphs of amplitude vs. time for several signals according to some embodiments.

FIG. 7 comprises graphs of amplitude vs. time for certain signals during operation of the FIG. 6 system according to some embodiments. Other hardware implementations may be used to result in the signal behavior illustrated in FIG. 7.

As shown in FIG. 7, Control Signal is high from time t=0 to t=A. DRV Control is also high from time t=0 to t=A, which enables power switching element 31 and causes Inductor Current to ramp up from t=0 to t=A. Inductor Current is non-negative from t=0 to t=A, so Logic Output remains high from t=0 to t=A. Logic Output thereby enables AND gate 70, and DRV Synch is 180 degrees out of phase with DRV Control from t=0 to t=A.

Control Signal goes low at t=A. Accordingly, DRV Control goes low and DRV Synch goes high. The magnitude of Inductor Current falls from t=A until t=B. Inductor Current begins to go negative at t=B, at which time comparator 33 detects current flow from the right to the left of resistor 29. Due to the detection of the current flow, Logic Output goes low at t=B and timer 34 is set. AND gate 70 is disabled at t=B by the low Logic Output signal, thereby disabling DRV Synch and power switching element 27. The disabling of element 27 may inhibit current from flowing from output capacitor 32 to ground through element 27.

The timer delay of timer 34 may be determined by values of an RC circuit such as circuit 35. The timer delay expires at time t=C. Timer 34 then causes Logic Output to go high, regardless of the state of Control Signal. Control Signal is low at t=C and, since Logic Output is high and AND gate 70 is enabled, DRV Synch goes high at t=C. DRV Synch causes power switching element 27 to conduct current at t=C, which results in a negative (i.e., right-to-left) Inductor current.

Control Signal from voltage controller 22 goes high at t=D, causing DRV Control to go high and DRV Synch to go low. Inductor Current begins to trend positive at t=D and continues to rise until t=E. Control Signal drops low at time t=E, causing DRV Control also to drop low and DRV Synch to go high. Inductor Current therefore begins to decrease after time t=E.

Returning to FIG. 6, some embodiments may provide enabling of power switching element 27 regardless of whether or not timer 34 has elapsed. According to some embodiments, logic circuit 26 sets timer 34 in association with the disabling of power switching element 27, detects an active control signal from voltage regulator controller 22, and enables power switching element 27 in response to detecting the active control signal. As described above, timer 34 may be set and Logic Output may be brought low in response to comparator 33 detecting the voltage drop from the right side to the left side of resistor 29. Next, logic circuit 26 receives an active (high) Control Signal from voltage regulator controller 22. The active Control Signal causes Logic Output to go high, thereby enabling AND gate 70 and power switching element 27.

Figure 8:
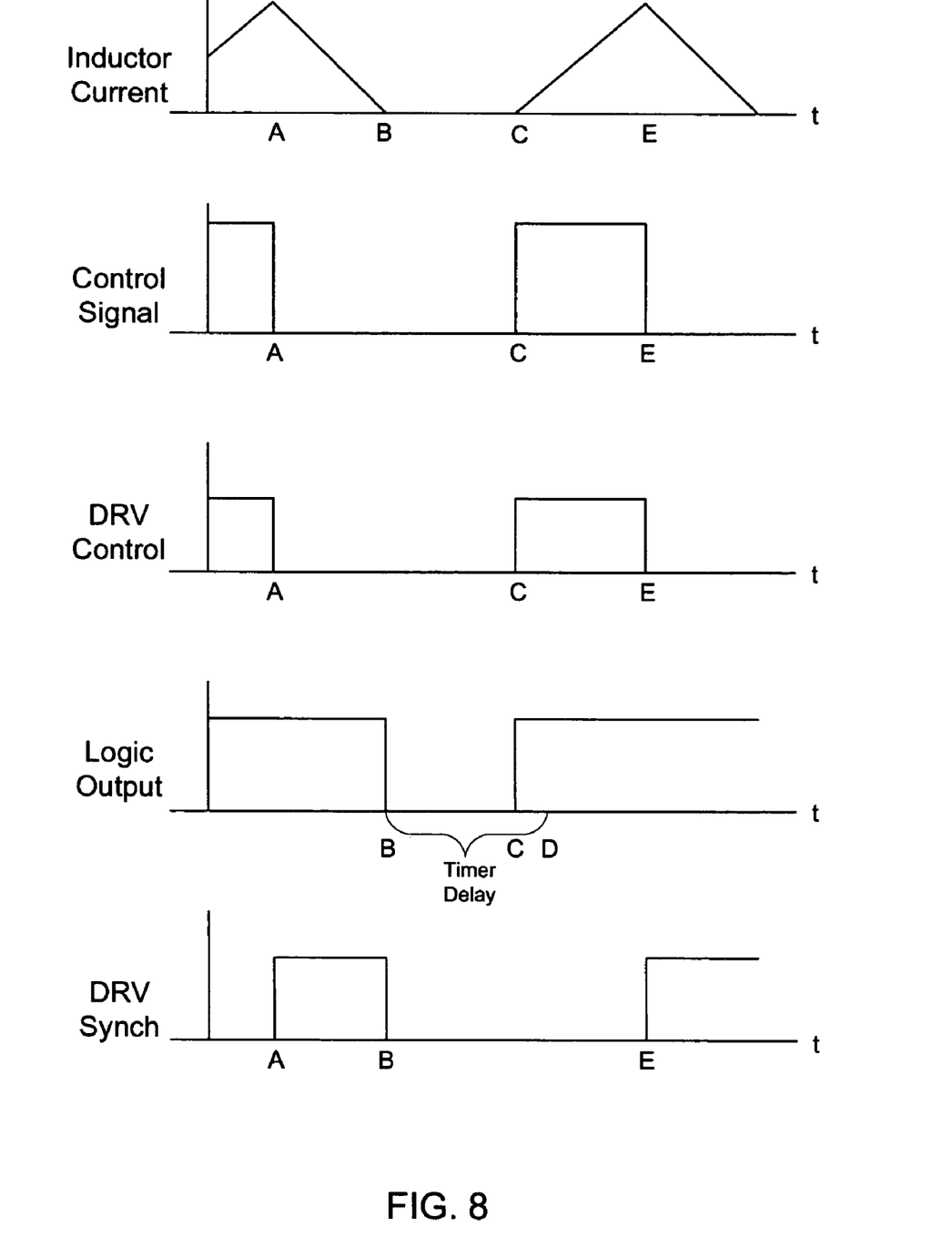
FIG. 8 comprises graphs of amplitude vs. time for several signals according to some embodiments.

FIG. 8 comprises graphs of amplitude vs. time for certain signals during operation of the FIG. 6 system according to the embodiments described above. Other hardware implementations may be used to result in the signal behavior illustrated in FIG. 8.

Control Signal begins high from time t=0 to t=A, causing signal DRV Control to also be high from time t=0 to t=A. The high DRV Control signal enables power switching element 31 and causes Inductor Current to ramp up from t=0 to t=A. Logic Output is high from t=0 to t=A because Inductor Current is non-negative during that time. The high Logic Output signal enables AND gate 70, and DRV Synch is therefore 180 degrees out of phase with DRV Control from t=0 to t=A.

Control Signal goes low at t=A, causing DRV Control to go low and DRV Synch to go high. Power switching element 27 thereby begins to conduct, causing Inductor Current to eventually go negative at t=B. Comparator 33 detects current flow from the right to the left of resistor 29 at t=B. In response to the detection, Logic Output goes low at t=B and timer 34 is set. AND gate 70 is disabled at t=B by the low Logic Output signal, thereby also disabling DRV Synch and power switching element 27.

According to FIG. 8, the Control Signal goes high at t=C. The change in Control Signal causes DRV Control and Logic Output both to go high, regardless of whether the timer delay of timer 34 has elapsed. In this regard, the timer delay elapses at t=D, and none of the FIG. 8 signals change in response thereto.

DRV Control goes high and DRV Synch goes low at t=C. Inductor Current therefore begins to rise at t=C and continues to rise until t=E. Control Signal drops low at time t=E, causing DRV Control also to drop low and DRV Synch to go high. Inductor Current therefore begins to decrease after time t=E.

Figure 9:
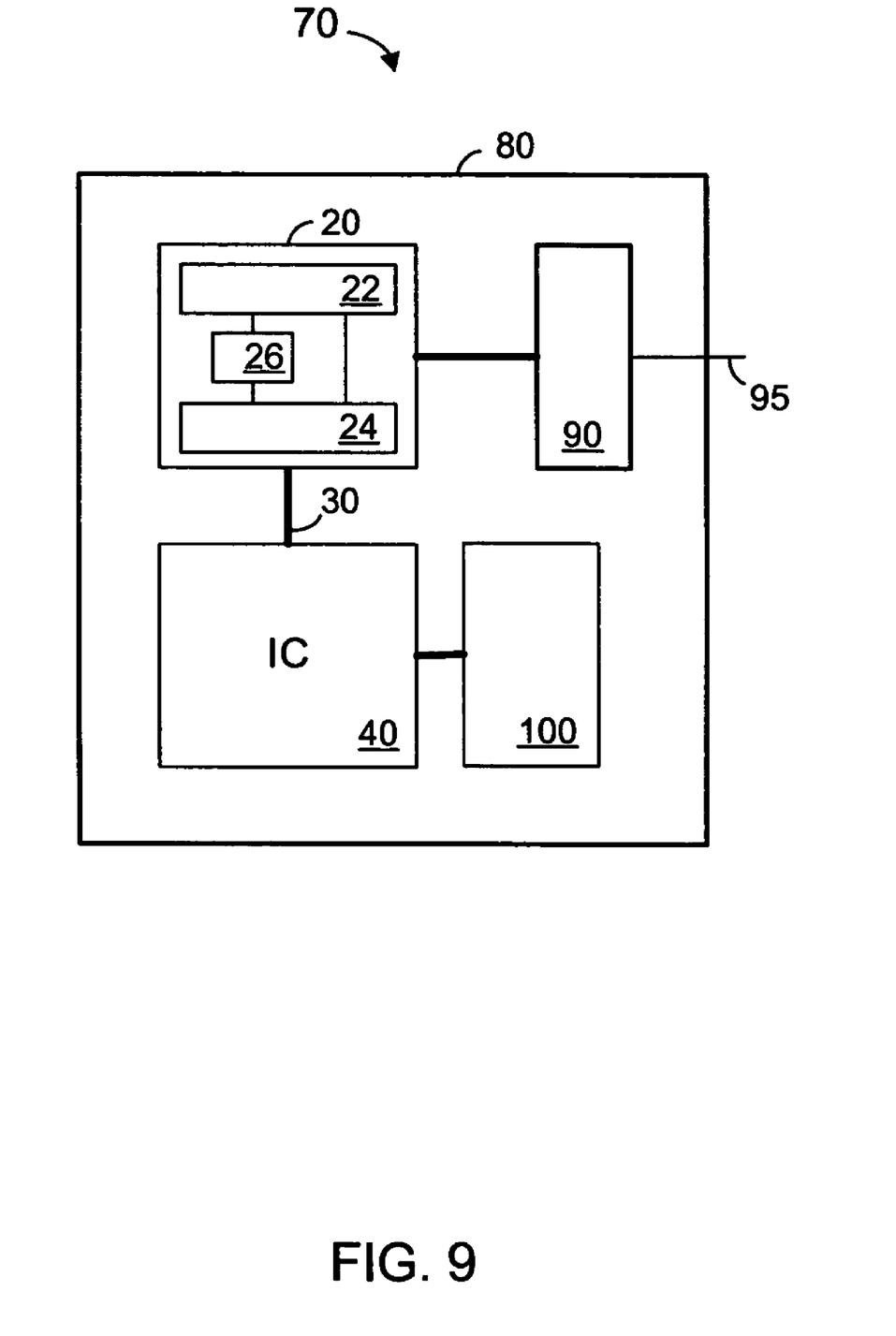
FIG. 9 is a block diagram of a system according to some embodiments.

FIG. 9 illustrates a system according to some embodiments. System 70 may execute process 50. System 70 includes voltage regulator 20, IC 40, motherboard 80, power supply 90, and memory 100. System 70 may comprise components of a desktop computing platform, and memory 100 may comprise any type of memory for storing data, such as a Single Data Rate Random Access Memory, a Double Data Rate Random Access Memory, or a Programmable Read Only Memory.

Voltage regulator 20 receives DC power from power supply 90 (which in turn receives AC power from power cord 95) and regulates the DC power to provide power to IC 40. Motherboard 80 therefore includes signal lines of power bus 30. Similarly, motherboard 80 may route I/O signals between IC 40 and memory 100.

The several embodiments described herein are solely for the purpose of illustration. Some embodiments may include any currently or hereafter-known versions of the elements described herein. Therefore, persons skilled in the art will recognize from this description that other embodiments may be practiced with various modifications and alterations.

What is claimed is:

1. A method comprising:
    detecting current flow into a voltage regulator converter from an output node of the voltage regulator converter;
    outputting a timer signal from a timer in response to the detected current flow; and
    disabling a power switching element of the voltage regulator converter based on the timer signal and on a control signal from a voltage regulator controller in response to detecting the current flow, the power switching element coupled between the output node and ground,
    wherein the voltage regulator converter receives the control signal from the voltage regulator controller and receives a second signal, wherein the second signal is the timer signal or an inverted control signal, and wherein the second signal is based on an output of an AND gate that receives both the timer signal and the inverted control signal.

2. A method according to claim 1, wherein disabling the power switching element comprises:
    disabling a control signal applied to a gate of the power switching element.

3. A method according to claim 1, further comprising:
    detecting no current flow from the output node to the voltage regulator converter;
    detecting a active control signal from a voltage regulator controller associated with the voltage regulator converter; and
    enabling the power switching element in response to detecting no current flow and detecting the active control signal.

4. A method according to claim 1, further comprising:
    detecting elapsing of the timer; and
    enabling the power switching element in response to the elapsing of the timer.

5. A method according to claim 1, further comprising:
    detecting a active control signal from a voltage regulator controller associated with the voltage regulator converter; and
    enabling the power switching element in response to detecting the active control signal.

6. An apparatus comprising:
    a voltage regulator controller to provide a control signal;
    a voltage regulator converter comprising a power switching element coupled between an output node of the voltage regulator converter and ground, the voltage regulator converter to receive the control signal;
    a logic circuit to detect current flow from the output node to the voltage regulator converter; and
    a timer to output a timer signal in response to the detected current flow, wherein the power switching element is disabled based on the timer signal and on the control signal in response to detecting the current flow,
    wherein the voltage regulator converter receives the control signal from the voltage regulator controller and a receives second signal, wherein the second signal is the timer signal or an inverted control signal, and wherein the second signal is based on an output of an AND gate that receives both the timer signal and the inverted control signal.

7. An apparatus according to claim 6, the logic circuit to disable the power switching element by disabling the control signal applied to a gate of the power switching element.

8. An apparatus according to claim 6, the logic circuit further to detect no current flow from the output node to the voltage regulator converter, to determine that the control signal is active, and to enable the power switching element in response to the detection of no current flow and the active control signal.

9. An apparatus according to claim 6, the logic circuit comprising:

a circuit to enable the power switching element in response to elapsing of the timer.

10. An apparatus according to claim 6, the logic circuit comprising:
a first circuit to determine that the control signal is active; and
a second circuit to enable the power switching element in response to the active control signal.

11. An apparatus according to claim 6, the logic circuit comprising:
a comparator to detect the current flow from the output node to the voltage regulator converter.

12. A system comprising:
a microprocessor;
a double data rate memory coupled to the microprocessor; and
a voltage regulator to provide an output voltage to the microprocessor, the voltage regulator comprising:
a voltage regulator controller to provide a control signal;
a voltage regulator converter comprising a power switching element coupled between an output node of the voltage regulator converter and ground, the voltage regulator converter to receive the control signal;
a logic circuit to detect current flow from the output node to the voltage regulator converter; and
a timer to output a timer signal in response to the detected current flow, wherein the power switching element is disabled based on the timer signal and on the control signal in response to detecting the current flow,
wherein the voltage regulator converter receives the control signal from the voltage regulator controller and a receives second signal, wherein the second signal is the timer signal or an inverted control signal, and wherein the second signal is based on an output of an AND gate that receives both the timer signal and the inverted control signal.

13. A system according to claim 12, the logic circuit to disable the power switching element by disabling the control signal applied to a gate of the power switching element.

14. A system according to claim 12, the logic circuit further to detect no current flow from the output node to the voltage regulator converter, to determine that the control signal is active, and to enable the power switching element in response to the detection of no current flow and the active control signal.

15. A system according to claim 12, the logic circuit comprising:
a circuit to enable the power switching element in response to elapsing of the timer.

16. A system according to claim 12, the logic circuit comprising:
a first circuit to determine that the control signal is active; and
a second circuit to enable the power switching element in response to the active control signal.

17. A system according to claim 12, the logic circuit comprising:
a comparator to detect the current flow from the output node to the voltage regulator converter.

* * * * *